United States Patent [19]

Blessing

[11] 4,047,622

[45] Sept. 13, 1977

[54] PALLET FEEDING APPARATUS

[75] Inventor: Hubert Blessing, Dallas, Tex.

[73] Assignee: Levi Strauss & Co., San Francisco, Calif.

[21] Appl. No.: 705,794

[22] Filed: July 16, 1976

[51] Int. Cl.² .............................................. B65G 59/02
[52] U.S. Cl. ................................ 214/8.5 A; 214/1 S;
   214/8.5 G; 214/8.5 H; 271/152; 271/158
[58] Field of Search ............... 271/157, 158, 154, 155,
   271/152; 214/8.5 R, 8.5 A, 8.5 C, 8.5 D, 8.5 F,
   8.5 G, 8.5 H, 8.5 SS, 1 S, 622, 6 P, 623

[56] References Cited

U.S. PATENT DOCUMENTS

| 2,247,466 | 7/1941 | Bauer et al. | 271/155 |
| 2,549,364 | 4/1951 | Bobst | 271/158 |
| 3,902,713 | 9/1975 | Von Lühmann et al. | 271/154 |

FOREIGN PATENT DOCUMENTS 673,930   6/1952   United Kingdom ................. 271/158

Primary Examiner—Frank E. Werner
Attorney, Agent, or Firm—Limbach, Limbach & Sutton

[57] ABSTRACT

Apparatus is disclosed for sequential feeding of a plurality of pallets, each carrying a stack of fabric sheet workpieces, to means for sequentially removing the individual sheets of sheet material. This apparatus includes vertically movable rack means for supporting the pallets, means for sensing the vertical position of the uppermost sheet of material on the uppermost pallet, motorized means for moving the pallets vertically upwardly to maintain the uppermost sheet at a predetermined position and means for removing an empty pallet after the sheet material is exhausted from that pallet.

10 Claims, 5 Drawing Figures

PALLET FEEDING APPARATUS

BACKGROUND OF THE INVENTION

This invention relates generally to the field of apparel manufacture and more particularly to the field of apparatus for feeding sheets of cloth or other material to processing apparatus.

In the field of apparel manufacture substantial progress has been made toward the mechanization of formerly tedious handwork. Apparatus has been made available for the bulk cutting of cloth and similar material into numerous identical pieces for standardized fabrication. Similarly, equipment has been made available for sequentially feeding such identical pieces from a stack into mechanized fabricating equipment for sewing and processing the pieces into finished goods. Exemplary of such equipment is the differentiator, or sheet separator and lifter, of U.S. Pat. No. 3,442,505. However, while this equipment has been capable of sequentially separating and feeding sheets from a stack, it has been necessary heretofore to momentarily shut down the fabricating line for reloading whenever such a stack has been exhausted. This requirement for shut-down is undersirable not only because of the temporary interruption but also because the sequencing and synchronization of much of the fabricating equipment must be reset each time the line is stopped.

Accordingly, it has been desired to have some means for continuously replenishing the stock of workpieces utilized in such mechanized equipment, such that the line may be replenished continuously without the requirement for shutdown.

Because of the space requirements of some mechanized garment assembly lines, it is necessary to provide such a replenishing means in a compact form. For example, pallet loaders wherein the pallets are transported horizontally for loading consume far too much valuable floor space and thus are uneconomical. Some types of vertical pallet loaders, while avoiding excessive consumption of floor space, require that the empty pallets must be removed vertically. This is a problem because it interferes with the operation of overhead type sheet differentiators such as described in the above mentioned patent, and which are positioned stationary over the topmost pallet of a vertical stack of pallets.

SUMMARY OF THE INVENTION

In response to the foregoing requirements, it is an object of the present invention to provide a compact pallet loader. It is another object of the invention to provide such a pallet loader which allows for horizontal removal of empty pallets. It is yet another object of the invention to provide such a pallet loader which does not require undue time to exchange an empty pallet for a loaded pallet and which will permit continuous operation of the fabricating line associated therewith.

To meet these objects apparatus has been developed according to the instant invention for providing for such continuous replenishment of an apparel fabricator line. This equipment thus enables such a line to run continuously without the previously experienced interruption for replenishing the supply of workpieces which are to be fabricated.

According to this invention pallet feeding apparatus is provided including a plurality of pallets for carrying stacks of sheet material workpieces, each such pallet having a handle projecting outwardly therefrom, vertically movable rack means for supporting the pallets in an upwardly facing orientation at vertically spaced positions and means for removing sequentially the individual workpieces from the uppermost pallet. Also included are means for sensing the vertical position of the uppermost remaining workpiece on the uppermost pallet and for generating a stack height control signal whenever the workpiece vertical position is below a predetermined level. Motorized means are provided for moving the rack means upwardly in response to any such stack height control signal, whereby the vertical position of the remaining uppermost workpiece may be maintained generally constant. Also provided are both means for sensing the absence of workpieces on the uppermost pallet on the rack and for generating a pallet removal control signal upon the sensing of such an absence, and motorized means responsive to the pallet removal control signal for gripping the handle of the uppermost pallet and for removing that handle and its associated pallet from the rack upon receipt of such a pallet removal control signal.

DESCRIPTION OF A PREFERRED EMBODIMENT

Figure 1:
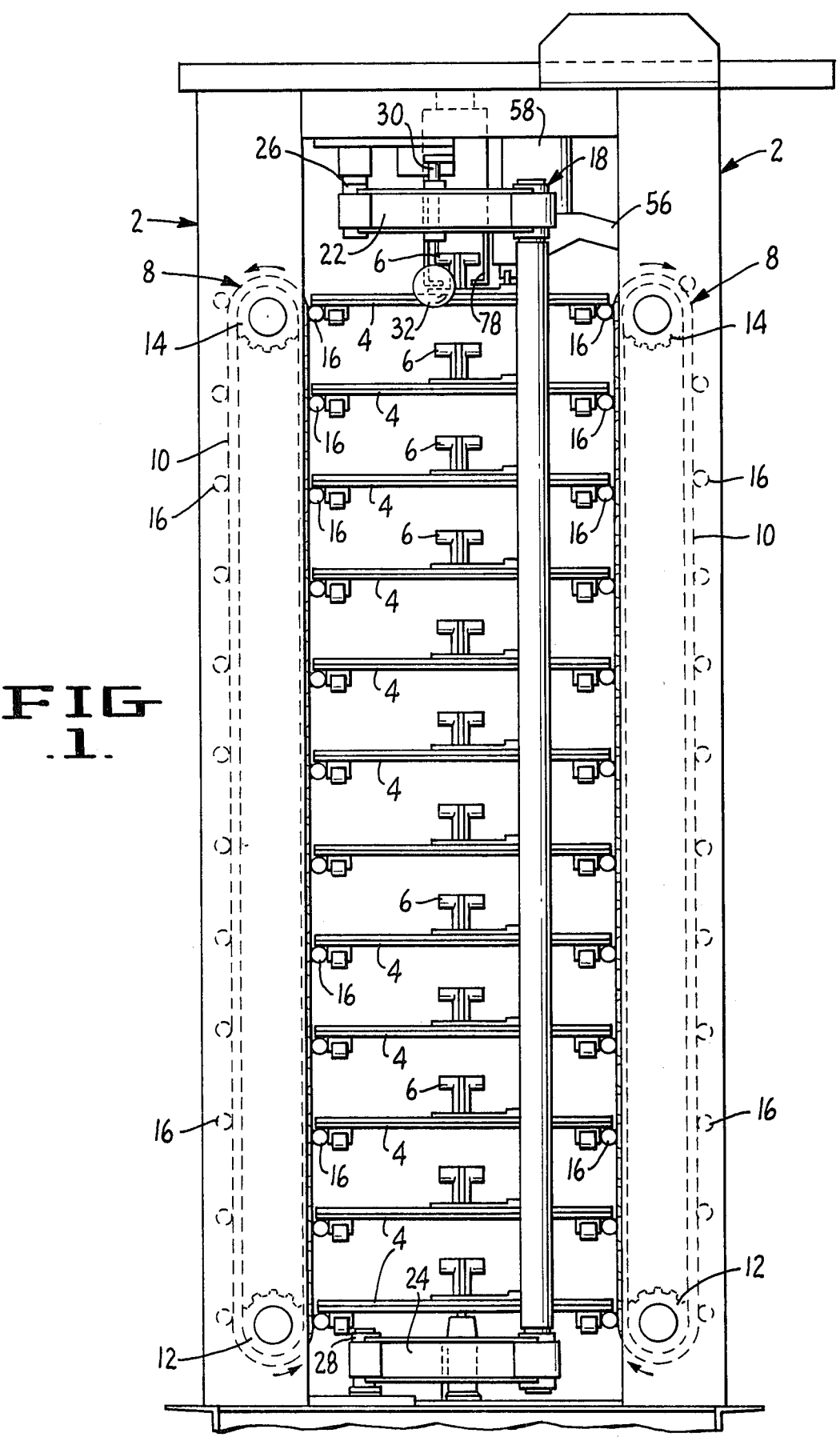
FIG. 1 is a front elevation of the pallet feeding apparatus of this invention.
Figure 2:
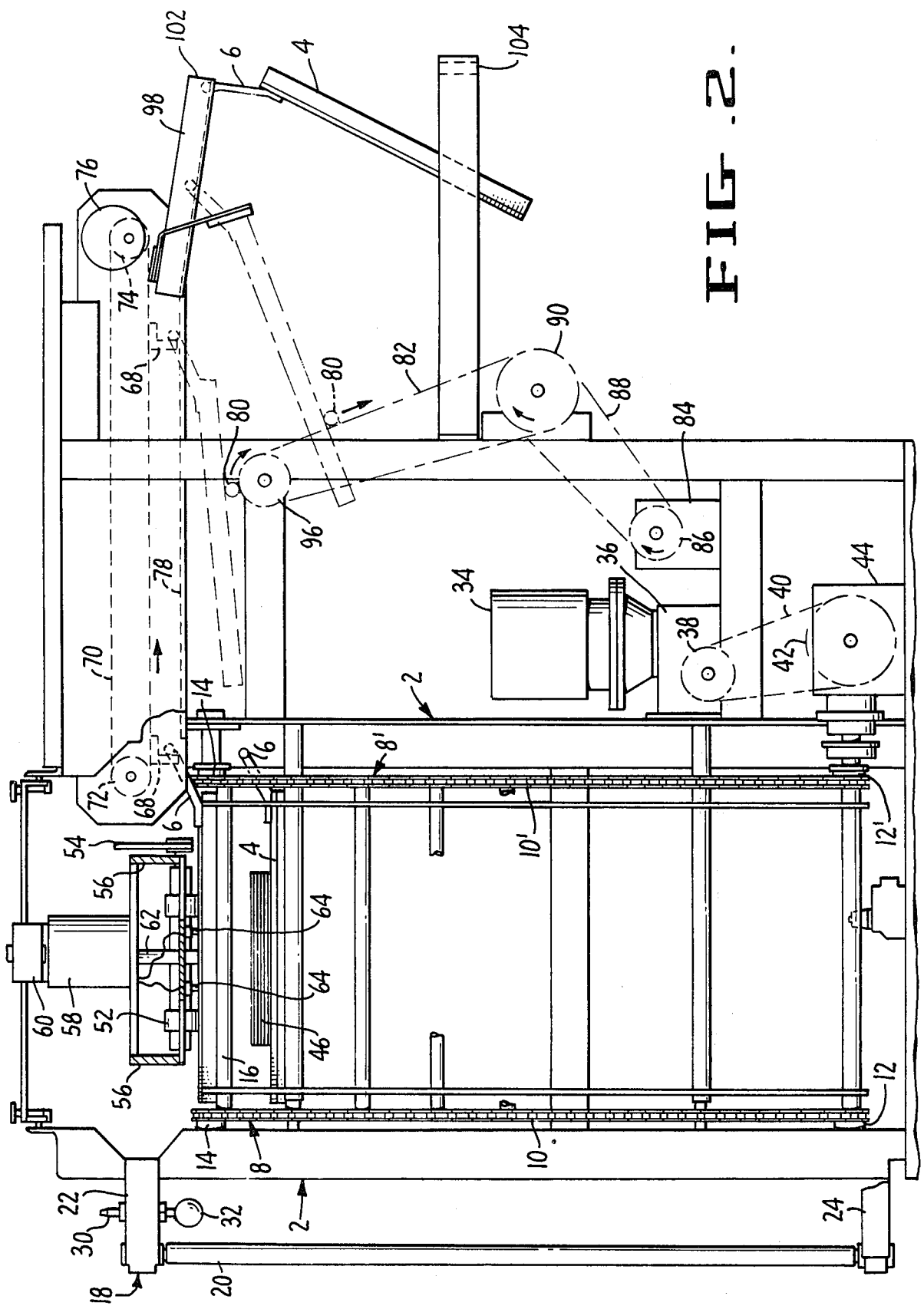
FIG. 2 is a side elevation, on a slightly smaller scale, of the apparatus of FIG. 1.
Figure 3:
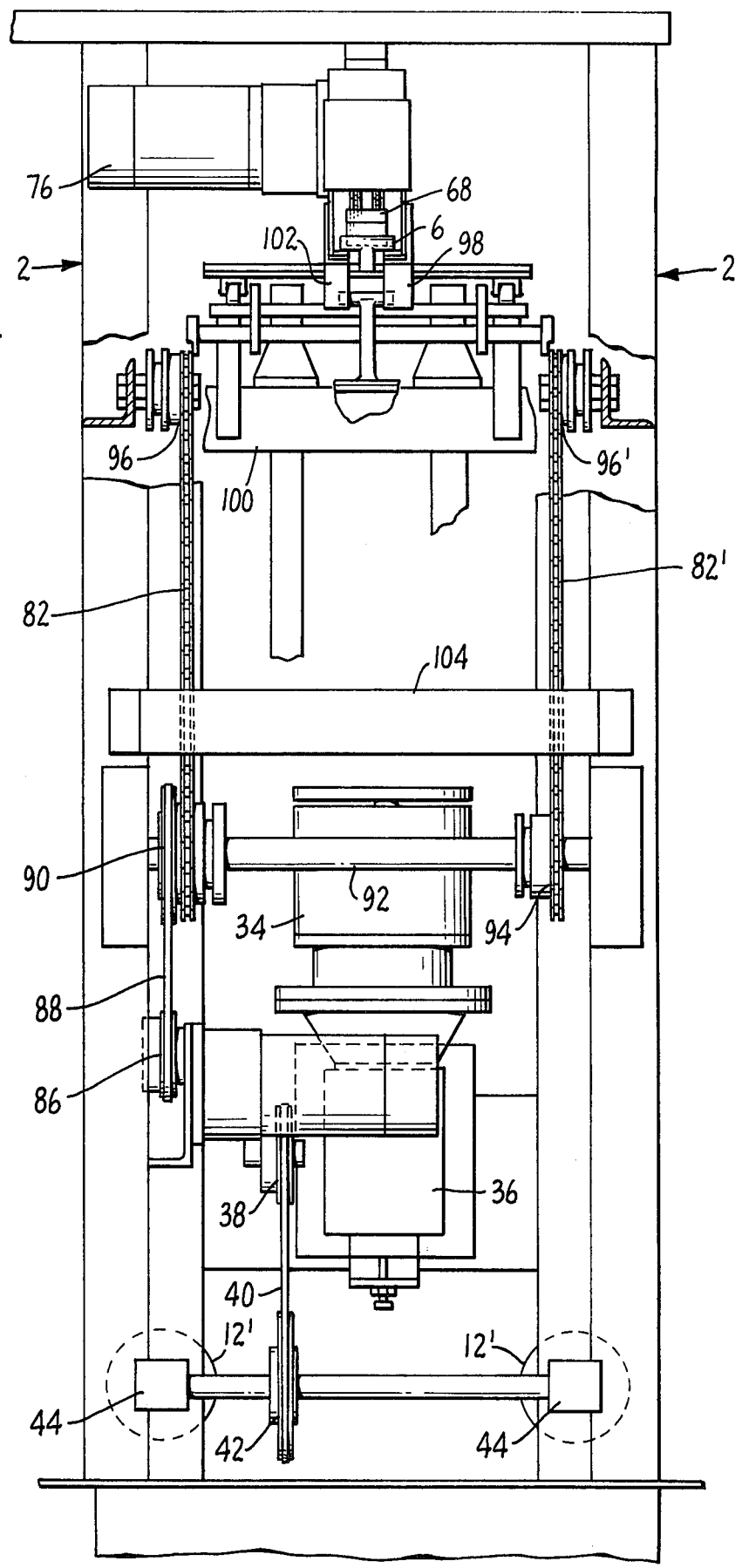
FIG. 3 is a rear elevation, partly in section, of the apparatus of FIG. 1.

The principal components of the pallet feeding apparatus of this invention are illustrated in FIGS. 1 through 3, in which FIG. 1 represents a front view, FIG. 2 represents a side view and FIG. 3 represents a rear view of the apparatus.

In FIG. 1 can be seen the vertically movable rack arrangement for supporting the pallets 4. These pallets 4, of light-weight metal or other suitable material with their attached, T-shaped handles 6, may more clearly be seen in FIG. 5, which illustrates a jig for positioning a stack of workpieces (broken line figure) on a pallet. The vertically movable rack or elevator assembly for supporting and lifting the pallets 4 comprises two pair of substantially identical, spaced, parallel chain lift assemblies 8 (toward the front of the apparatus) and 8' (toward the rear of the apparatus). Each such assembly comprises two parallel, endless chains 10 (and 10') running over drive sprockets 12 and idler sprockets 14 journaled to the frame 2. Extending between each chain assembly 8 and its parallel assembly 8' are a plurality of pallet supports 16 spaced along and attached to each chain 10 and 10'. (For clarity of illustration it may be noted that only a few of the pallet and chain support sets of FIG. 1 are illustrated in FIG. 2, and only the uppermost pallet and the next lower pallet are illustrated in FIG. 3.) From this arrangement, it may be seen that each of the pallets 4 in the rack is supported along its opposed edges by its engagement with chain mounted pallet supports 16. Thus, driving rotation of sprockets 12 (and 12') in the directions indicated by the arrows serves to elevate the pallet 4 while retaining their vertically spaced positions.

In FIGS. 1 and 2 may be seen the pivotally movable pallet retainer assembly 18 for holding the pallets 14 in the rack during the workpiece feeding operation and the lifting of the pallets sequentially into the feeding position. This retainer assembly 18 comprises a vertically extending retainer bar 20 attached to arms 22 and 24 which are attached to the frame 2 by pivotal mounts 26 and 28, respectively. Thus, the retainer assembly 18 may be pivotally moved between a closed position, as illustrated in FIG. 1 and an open position, illustrated in FIG. 2, swung away from the pallets. In the closed position locking plunger 30, which is spring loaded and operated by means of the spherical handle 32, may engage a detent (not shown) attached to the frame 2 to releasably hold the retainer assembly 18 in the closed psoition illustrated in FIG. 1. In this closed position, the pallets 4 are restrained against unintended movement outwardly of the front of the rack.

When the pallets 4, carrying their workpieces, have been loaded into the movable rack assembly, they may be lifted vertically by movement of the drive chains 10 and 10' in the direction indicated by the arrows in FIG. 1. Thus, the uppermost pallet supported by the member 16 attached to the drive chains may be lifted up to a position in which the sheet material workpieces stacked upon it may be selectively removed.

Apparatus for driving the elevator chains 10 and 10' may be seen more clearly in FIGS. 2 and 3. The drive motor 34, which is controlled by a stack height control signal, operates through a right angle drive reduction gear box 36 to drive a pulley or sprocket 38. The sprocket or pulley 38 is drivingly connected by means of a belt or chain to another pulley or sprocket 42, which is connected to a pair of right angles boxes 44. Connected to the output of the right angle drive 44 are sprockets 12 and 12', connected by shaft 46 and described above, which drive the lifting chains 10 and 10'. Thus, whenever a stack height control signal is generated, the drive motor 34 is activated to drive the elevator chains 10 and 10' to lift the pallets carried by the supports 16.

Figure 4:
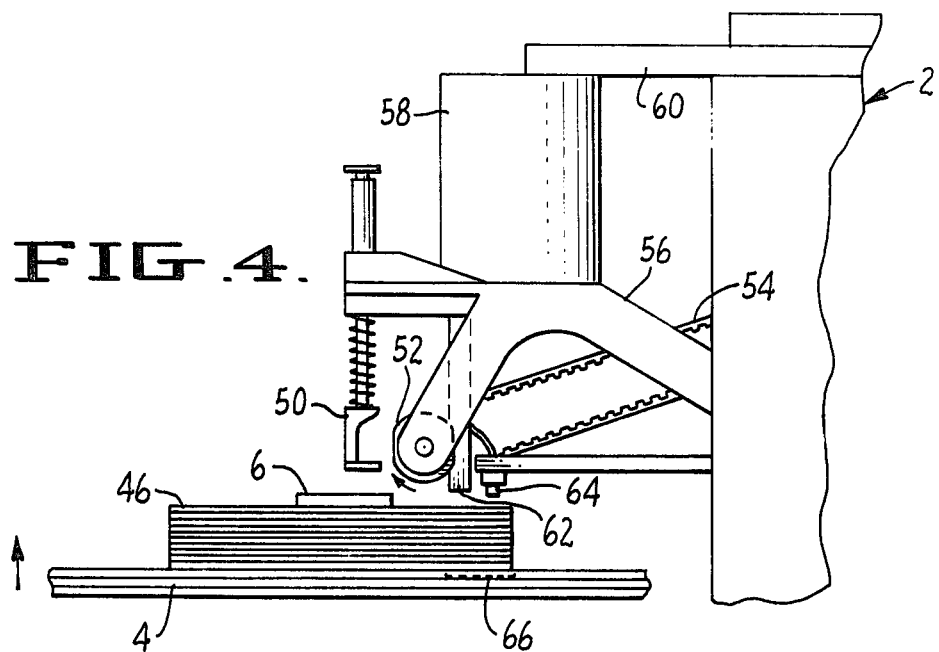
FIG. 4 is a fragmentary front view of the differentiator and control signal generating apparatus of this invention.

The stack height control signal for driving the elevating rack is generated by apparatus associated with the differentiator, or sheet separator, and shown most clearly in FIGS. 2 and 4. As noted above, the differentiator may suitably be of the nature disclosed in Szentkuti U.S. Pat. No. 3,442,505, the disclosure of which is incorporated herein by reference. Due to this incorporation by reference the mounting structure and components of the differentiator are not illustrated in detail in this application. As with the referenced differentiator, the basic components comprise the clamp 50, the rotating frictional member 52 driven by suitable means such as a toothed timing belt 54, and pivotally mounted frame members 56.

As noted in the Szentkuti patent, this differentiator assembly, through mounted relatively stationary, is periodically brought down into contact with a stack of sheet material workpieces 46 to feed the uppermost workpiece from the stack. The stack height control signal generator comprises a sensor 58 rigidly affixed by means of bracket 60 to frame members 2. The sensor 58 includes a plunger 62 extending downwardly to a predetermined level and toward the stack of workpieces 46 carried on the uppermost pallet 4. The downward extent of this plunger 62 defines a predetermined level at which the uppermost sheet of the stack of material 46 is desired to be maintained for most efficient operation of the differentiator.

As long as the uppermost sheet of material 46 is in contact with the lowermost portion of plunger 62, an electromagnetic circuit within sensor 58 is open, thus generating no stack height control signal. However, whenever the uppermost sheet of material is below this level and thus out of contact with plunger 62, the signal generating circuit within sensor 58 is closed to generate a stack height control signal. This signal then actuates the rack elevator chain drive motor 34 to raise the pallet to bring the sheet material to the desired level. Since the circuitry and sensor 58 used to generate this stack height control signal can be of conventional design and configuration, they are not described in further detail.

From the operation of the stack height sensor 58 it may be seen that the uppermost remaining sheet of material 46 on a given pallet will be maintained at the desired height for removal and feeding by the differentiator. However, when the last sheet of material has been removed from a given pallet, as illustrated in FIG. 2, it is desirable to remove that empty pallet and to bring the adjacent lower pallet upwardly into a sheet dispensing position. As previously discussed above, in order to avoid shut down and the necessary resetting of the sequencing of the other equipment on the fabricating line, it is desirable that this empty pallet be removed and the next loaded pallet be brought into position sufficiently quickly that no interruption occurs in the feeding. Accordingly, it is necessary to generate a pallet removal control signal whenever a pallet is empty.

Figure 5:
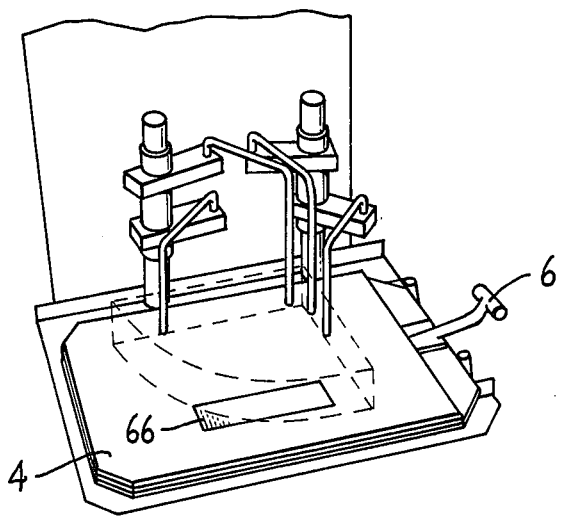
FIG. 5 is a perspective view of a jig for aligning work pieces on a pallet of the apparatus of FIG. 1.

The means for generating the pallet removal control signal is illustrated in FIGS. 2, 4 and 5, and includes two spaced electrodes 64 and a cooperating conductive metal member 66 attached to each pallet. The contacts 64 suitably may comprise a gap in a circuit for generating the pallet removal control signal, and suitably may comprise a pair of spring loaded plungers with the springs urging them downwardly of the level determined by stack height control signal plunger 62. The conductive metallic member 66 attached to each pallet is positioned to lie directly below the contacts 64 when the pallet is in its dispensing position. The workpieces carried on the pallet, suitably of cloth or other flexible material, are electrically insulating. Accordingly, as long as one sheet of the material 46 remains on the pallet, overlying the conductive member 66 and positioned between the member 66 and the contacts 64, the circuit between the contacts 64 remains open. However, upon removal of the last remaining workpiece on the pallet, the spring loaded plungers in the contacts 64 are urged downwardly into contact with the conductive metallic plate 66, thus closing the pallet removal control signal generating circuit and generating such a signal indicating the absence of workpieces on the pallet. The generation of this pallet removal control signal activates equipment to remove the empty pallet, as will be now be explained in greater detail.

The apparatus for withdrawing an empty pallet from the rack is most clearly illustrated in FIGS. 2 and 3 and generally comprises means for gripping the T-shaped handle 6 of the pallet and moving it transversely outwardly of the rack, and means for supporting the empty pallet after it has been so removed. Specifically, the apparatus includes a gripper 68 extending outwardly of an endless flexible driving member 70, suitably a chain, which is moved in the direction indicated by the arrow in FIG. 2. The driving member or chain 70 is supported at a point proximal the uppermost pallet in the rack by sprocket 72 and at a point distal that pallet by sprocket 74. The sprocket 74 is driven by motorized means 76 in response to the pallet removal control signal generated by the closing of the circuit between contacts 64.

Upon the activation of drive motor means 76 and thus chain 70, the handle gripper 68 is brought around sprocket 72 into engagement with the handle 6 of the uppermost pallet, and both are advanced orthogonally outwardly of the vertically extending supporting rack and suitably in a direction orthogonal to the direction of removal of the workpieces. As the handle (and thus the pallet) is withdrawn from the rack, the T-shaped handle 6 is advanced along the slotted channel 78, whose lips extend under the outwardly projecting portions of the cross bar of the T-shaped handle. Thus, when the pallet has been removed sufficiently from the supporting rack that it is no longer fully supported by the members 16, the T-shaped handle may rest upon and be supported by the lips of the slotted channel member 78. In this manner, until the pallet is completely withdrawn from support by rack members 16, it is supported by the combination of contact with those members 16 and by the engagement of the handle 6 with the slotted channel 78. As the gripper is further advanced toward distal sprocket 74, the pallet will ultimately be fully withdrawn from any support by rack member 16. At this point, the pallet, supported at one end by the handle 6 will drop down into contact with let-down bar 80. This let-down bar 80 is attached to parallel, opposed let-down chains 82 and is maintained at rest at the uppermost position of those chains, as illustrated in FIGS. 2 and 3. At this point, the pallet will be in the position indicated by the broken line representation of FIG. 2.

Essentially simultaneously with the receipt of the pallet removal control signal by gripper drive motor 76 the signal will also activate let-down drive motor 84. This drive motor 84, through a suitable gear reduction, will drive sprocket 86 and thus chain 88. As is best seen in FIG. 3, chain 88 is received onto a duplex sprocket 90 which also drives let-down chain 82 and which is connected by a shaft 92 to a sprocket 94 for driving the opposed, parallel let-down chain 82'. Thus, when let-down drive motor 84 is activated, the let-down bar 80 attached to chains 82 and 82' will be advanced downwardly from a position adjacent upper sprockets 96 and 96' toward a position adjacent lower sprockets 90 and 94. At the same time, the gripper 68 has continued to advance the handle 6 of the pallet outwardly along the slotted channel member 78 to a downwardly inclined outer portion 98 of the slotted channel member. As the gripper 68 approaches and is rotated about distal sprocket 74, the gripper is rotated up out of engagement with the pallet handle 6. At this point, the downwardly sloping portion 98 of the slotted channel will serve to continue to urge the handle, and thus the pallet, outwardly and downwardly under the influence of gravity. However, at that point, further outward movement of the pallet is restrained by its engagement with bumper 100, as illustrated in the dot-and-dash representation of FIG. 2. Thus, continued outward movement of the pallet is temporarily halted. During this time the let-down drive motor 84 continues to run, slowly driving the let-down chains 82 and 82' in the direction indicated by the arrow, thus advancing the let-down bar 80 to the position indicated by the broken line in FIG. 2. As this let-down bar 80 approaches lower pulleys 90 and 94, the pallet is permitted to pivot downwardly about its contact between its handle 6 and the slotted channel portion 98 until the pallet may swing under the bumper 100. At this point the pallet 4, supported only by the engagement of its handle 6 with the slotted channel portion 98, may slide to the stop 102 at the end of the channel portion 98, under the influence of gravity. A looped retaining member 104 is also provided to prevent excessive swing of the pallet upon reaching the stop 102. The let-down drive motor 84 continues to run until the let-down bar 80 is brought again to its uppermost position, where a limit switch (not shown) terminates the operation until another pallet's removal control signal is received.

By the operation of this pallet removal mechanism the pallet may be advanced rapidly outwardly until it engages bumper 100 and then stop until it is gently lowered by the let-down apparatus, so that the pallet may swing gently to its stored position against stop 102 without violent collision against other adjacent pallets or other portions of the equipment. By the slotted configuration of stop 102 the stored empty pallets may be removed from the stored position for reloading and reuse, without stopping operation of the apparatus.

As is apparent, this equipment provides for the continual insertion of freshly loaded pallets into the lower portion of the lifting rack assembly while work pieces are being fed from the uppermost pallet. Additionally, by the rapid removal of empty pallets from the rack and elevation of the adjacent, loaded pallet below, the operation of the work piece or sheet feeder and the remainder of the equipment on the fabrication line may be continuous. Similarly, by the stacking of the withdrawn empty pallets at the end of the split channel, these empty pallets may easily be removed from the machine for reloading and reinsertion while work pieces are being fed from other pallets.

While the foregoing description illustrates in detail one preferred embodiment of the apparatus of this invention, it is to be recognized that numerous modifications, all within the scope of the invention, will readily become apparent to those skilled in the art. Accordingly, the foregoing description is intended to be illustrative only and not to be limitative of the invention. The invention is to be limited solely by the scope of the claims appended hereto.

What is claimed is:

1. Pallet feeding apparatus comprising
a plurality of pallets for carrying stacks of sheet material workpieces, each said pallet having a handle projecting outwardly therefrom;
vertically movable rack means for supporting said pallets in an upwardly facing orientation at vertically spaced positions;
means for removing sequentially the individual workpieces from the uppermost said pallet;
means for sensing the vertical position of the uppermost remaining workpiece of said sheet material on the uppermost said pallet and for generating a stack height control signal whenever said workpiece vertical position is below a predetermined level;
first motorized means for moving said rack means vertically upwardly in response to said stack height control signal, whereby the vertical position of the remaining uppermost sheet may be maintained generally constant;
means for sensing the absence of sheet material workpieces on said uppermost pallet in said rack and for generating a pallet removal control signal upon sensing of said absence; and second motorized means responsive to said pallet removal control signal for gripping said handle of said uppermost pallet and for removing said handle and pallet from said rack means upon receipt of said pallet removal control signal.

2. Pallet feeding apparatus according to claim 1 wherein the direction of said removal of said workpieces and the direction of removal of said pallets are orthogonal to each other and to the vertical.

3. Pallet feeding apparatus according to claim 1 wherein said pallet gripping and removing means comprises an endless flexible driving member extending between a point proximal said uppermost pallet in said rack means and a point distal said rack means;

selectively controllable motorized means responsive to said pallet removal control signal for driving said driving member between said points;

a handle gripper mounted on and extending outwardly of said driving member and means for supporting said driving member proximal said uppermost pallet and for bringing said handle gripper into engagement with said uppermost pallet handle when said gripper is proximal said pallet handle, whereby driving movement of the driving member may serve to bring the handle gripper into temporary engagement with the uppermost pallet handle and to withdraw that pallet from the rack means as the gripper is moved away from the rack means.

4. Pallet feeding apparatus according to claim 3 further comprising handle support means for providing vertical support to said uppermost pallet handle while said pallet is being removed from said rack means;

means adjacent said distal point for supporting said driving member and for rotatably removing said handle gripper from engagement with said gripped pallet handle, whereby said gripper may be out of engagement with said pallet handle when said pallet has been withdrawn from said rack means.

5. Pallet feeding apparatus according to claim 4 further comprising pallet support means cooperating with said handle support means for releasably engaging and supporting said pallet after said removal from said rack means; and releasable means for restraining movement of said pallet and pallet handle along said handle support means while said pallet support means is in engagement with said pallet.

6. Pallet feeding apparatus according to claim 5 wherein said pallet support means is movable downwardly to provide for downwardly pivoting movement of said supported pallet, and wherein said downward movement provides for said release of said engagement and support between said pallet and said pallet support means, whereby, upon the downward movement and release by the pallet support means, the pallet may be supported by the engagement between the handle and the handle support means.

7. Pallet feeding apparatus according to claim 6 wherein the portion of said handle support means adjacent and extending outwardly of said pallet feeding apparatus from said releasable pallet restraining means is inclined downwardly, and wherein said pivoting movement of said pallet provides for release of said pallet restraining means, whereby, upon release of the pallet by the pallet support means, the pallet will also be released by the pallet restraining means, and the pallet may move outwardly along the handle support means, under the influence of gravity.

8. Pallet feeding apparatus according to claim 7 further comprising stop means adjacent the outermost end of said handle support means for limiting movement of said pallet handle outwardly of said apparatus; and pivot limiting means spaced below said stop means for limiting pivotal movemet of said pallet outwardly of said apparatus.

9. Pallet feeding apparatus according to claim 1 wherein said workpiece sheet material is electrically insulating and said means for sensing the absence of workpieces on said uppermost pallet comprises an electrically conductive member positioned on the upwardly facing surface of each said pallet beneath the lowermost said workpiece carried thereupon, a pair of spaced electrical contacts mounted to said apparatus and positioned above said uppermost pallet conductive member, said spaced contacts comprising a gap in a circuit for generating said pallet removal control signal; and means urging said electrical contacts downwardly of said predetermined level toward said pallet, whereby, upon removal of the last remaining workpiece from the pallet, the contacts will be urged against the pallet conductive member, thus closing the gap in the pallet removal control signal generating circuit and providing for generation of a pallet removal control signal.

10. Pallet feeding apparatus according to claim 1 further comprising means for loading said pallets into said rack means from a side different from the side from which said pallets are removed by said pallet removing means, whereby pallets may be loaded into the means while other pallets are being removed therefrom.

* * * * *

UNITED STATES PATENT AND TRADEMARK OFFICE
CERTIFICATE OF CORRECTION

PATENT NO. : 4,047,622
DATED : September 13, 1977
INVENTOR(S) : Hubert Blessing

It is certified that error appears in the above–identified patent and that said Letters Patent are hereby corrected as shown below:

In the heading under References Cited - U. S. Patent Documents insert:

| | | | |
|---|---|---|---|
| 2,335,078 | 11/1943 | Osborn | 271/158 |
| 3,057,266 | 10/1962 | von Hofe et al | 271/158 |
| 3,583,695 | 6/1971 | Sherwood | 271/21 |

Signed and Sealed this

Twelfth Day of June 1979

[SEAL]

Attest:

RUTH C. MASON
Attesting Officer

DONALD W. BANNER
Commissioner of Patents and Trademarks